United States Patent
Markovitz et al.

(10) Patent No.: US 6,359,232 B1
(45) Date of Patent: Mar. 19, 2002

(54) ELECTRICAL INSULATING MATERIAL AND STATOR BAR FORMED THEREWITH

(75) Inventors: Mark Markovitz, Schenectady; James Jonathan Grant, Niskayuna; William Edward Tomak, Scotia; William Paul Dobbins, Clifton Park, all of NY (US)

(73) Assignee: General Electric Company, Schenectady, NY (US)

( * ) Notice: Subject to any disclaimer, the term of this patent is extended or adjusted under 35 U.S.C. 154(b) by 648 days.

(21) Appl. No.: 08/770,037

(22) Filed: Dec. 19, 1996

(51) Int. Cl.[7] .............................................. H01B 17/32
(52) U.S. Cl. .................. 174/209; 310/196; 174/137 B; 174/138 C
(58) Field of Search ........................ 174/138 C, 137 A, 174/137 B, 209; 310/45, 196, 189, 215

(56) References Cited

U.S. PATENT DOCUMENTS

| | | | | |
|---|---|---|---|---|
| 3,137,612 A | * | 6/1964 | Chu et al. ................... 428/328 |
| 3,563,850 A | | 2/1971 | Stackhouse et al. ........ 428/413 |
| 3,801,392 A | * | 4/1974 | Scheel et al. ................ 156/51 |
| 4,013,987 A | * | 3/1977 | Foster ........................ 336/206 |
| 4,335,367 A | * | 6/1982 | Mitsui et al. ............... 336/205 |
| 4,415,674 A | * | 11/1983 | Johnson ...................... 501/104 |
| 4,521,549 A | * | 6/1985 | Penneck ...................... 523/173 |
| 4,576,856 A | * | 3/1986 | Kuwajima et al. .......... 442/296 |
| 4,760,296 A | * | 7/1988 | Johnston et al. ............. 310/45 |
| 4,806,806 A | * | 2/1989 | Hjortsberg et al. ........... 310/45 |
| 5,393,805 A | * | 2/1995 | Koyama et al. ............. 523/400 |
| 5,574,325 A | * | 11/1996 | Von Musil et al. ......... 310/215 |

* cited by examiner

Primary Examiner—Jeffrey Gaffin
Assistant Examiner—Kamand Cuneo
(74) Attorney, Agent, or Firm—Gary M. Hartman; Domenica N. S. Hartman

(57) ABSTRACT

Resin-impregnated sheet materials, such as fabrics, films, paper and tapes, for forming electrical insulation that exhibits significantly improved voltage endurance performance. The present invention finds particular use as groundwall insulation for high voltage generator stator bars, in which the groundwall insulation is formed by mica tape filled with submicron particles of silicon dioxide, aluminum oxide, titanium dioxide and/or zirconium dioxide, in combination with an unfilled mica tape impregnated with the same or compatible resin binder. The filled tape is preferably in the form of a mica paper having at least one woven fabric on at least one of its surfaces, a resin binder permeating the mica paper and woven fabric so as to bond the woven fabric to the mica paper, and oxide particles dispersed in the woven fabric.

20 Claims, 3 Drawing Sheets

ELECTRICAL INSULATING MATERIAL AND STATOR BAR FORMED THEREWITH This invention generally relates to electric insulation materials. More particularly, this invention is directed to sheet materials for forming groundwall insulation of a high voltage generator stator bar, in which oxide-filled sheet material is used in combination with oxide-free sheet material, yielding a stator bar having significantly improved voltage endurance performance.

BACKGROUND OF THE INVENTION

Polymer-impregnated sheet materials, such as fabrics, films, paper and tapes, have been widely employed to form electrical insulation for various electrical equipment and components, including high voltage stator bars of generators. Formation of such insulation generally involves the use of a pre-impregnated sheet material, often referred to as a prepreg, that can be applied directly to a member to be insulated. Various materials can be employed as the sheet material and the impregnation material, depending on the requirements of the application.

Referring to FIG. 1, a stator bar 10 for a generator is represented that is illustrative of high voltage stator bars known in the prior art. As shown, the stator bar 10 is composed of a number of conducting copper strands 12 that are insulated from each other by strand insulation 13. The strands 12 are arranged to form two tiers that are separated by a strand separator 14. Surrounding the tiers is a groundwall insulation 15 formed by multiple wrappings of a mica paper tape 16.

As illustrated in FIGS. 2 and 3, the mica paper tape 16 is a prepreg composed of a mica paper 17 backed by a single woven backing 18 as shown in FIG. 2, or a pair of backings 18a and 18b as shown in FIG. 3. In the configuration of FIG. 3, one of the backings 18a or 18b can be a woven fabric such as fiberglass while the second can be another woven fabric, a nonwoven fabric such as a polyester mat, or a polymer film such as polyester, polyimide or polyetherimide film. In each case, a resin composition is used to permeate through the mica paper 17 and to bond each backing 18, 18a and 18b to the mica paper 17, thereby forming the prepreg tape 16.

Various resin compositions can be used to impregnate the mica paper 17 and backings 18, 18a and 18b, an example of which is evidenced by U.S. Pat. No. 3,563,850 to Stackhouse et al., assigned to the assignee of this invention. Stackhouse et al. teach mica tapes for electrical insulation using a solventless epoxy-based resin composition. Prepregs of the type taught by Stackhouse et al. are typically slit into tapes that can be more readily wrapped around a stator bar of a generator. Typically, multiple layers of tape are tightly wrapped around the conductor, usually overlapping by one-half the width of the tape, or "half-lapped." After being wrapped with a sacrificial release film to protect the tape and prevent contamination, the conductor and its tape wrapping are then placed in an autoclave for vacuum heat treatment and subsequent curing. Vacuum heat treatment is carried out to remove air, moisture and any solvent or volatile compound present in the resin binder, while curing under pressure serves to consolidate the tape insulation, such that the resin binder bonds the mica paper and each of its backings together to form a void-free solid insulation.

Removal of air, moisture, solvents and volatile compounds from the binder is necessary to prevent formation of voids in the cured insulation that would otherwise adversely affect the quality of the insulation and induce premature insulation failure due to breakdown under electrical stress. The latter characteristic of insulation is termed "voltage endurance," and is quantified as the time-to-failure or breakdown of the groundwall insulation under high voltage electrical stress. Voltage endurance breakdown is normally due to erosion by electrical discharge and electrochemical attack. By conducting voltage endurance tests at different voltages, a relationship of life versus stress can be determined for a specific insulation system.

Improvement of voltage endurance performance of high voltage generator stator bars is a continuous and desirable objective because of product reliability and machine performance. Improvements in voltage endurance performance have been achieved with synthetic, thermosetting polymeric materials such as epoxy and polyester resins. Further improvements in voltage endurance have been made through further refinements in the resin binder, such as modified or new resin compositions and hardener chemistries, as taught by Stackhouse et al. Nonetheless, further improvements in voltage endurance are desirable.

SUMMARY OF THE INVENTION

It is an object of this invention to provide an insulation material that exhibits enhanced voltage endurance.

It is a further object of this invention that such an insulation material is suitable as groundwall insulation for a high voltage generator stator bar.

It is another object of this invention that such an insulation material is formed by layers of resin-rich sheet material, wherein at least one of the layers is formed by a sheet material containing submicron oxide particles while at least one other is free of such oxide particles.

The present invention provides resin-impregnated sheet materials, such as fabrics, films, paper and tapes, to form electrical insulation that exhibits significantly improved voltage endurance performance. While the present invention finds particular use with conductors that are insulated with resin-rich tapes processed by press-curing or autoclaving, in which a taped conductor is first vacuum and heat treated to remove air and volatile components and then compacted and cured by applying heat and pressure, this invention is also applicable to vacuum-pressure impregnation processes where two or more tapes are wrapped around a conductor and then the taped conductor is vacuum-pressure impregnated with a solventless, low viscosity resin.

According to this invention, the voltage endurance performance of a high voltage generator stator bar is improved by forming the groundwall insulation using a mica tape filled with submicron particles of silicon dioxide ($SiO_2$), aluminum oxide ($Al_2O_3$), titanium dioxide ($TiO_2$) or zirconium dioxide ($ZrO_2$), in combination with an unfilled mica tape, in which the tapes are impregnated with the same or compatible resin binders. More particularly, the filled tape is in the form of an electrical insulating sheet comprising a mica paper having at least one woven fabric on at least one of its surfaces, a resin binder permeating the mica paper and woven fabric so as to bond the woven fabric to the mica paper, and oxide particles dispersed in the woven fabric. As noted above, the oxide particles are silicon dioxide, aluminum oxide, titanium dioxide and/or zirconium oxide. In addition, the oxide particles preferably have a particle size of about 0.005 to about 0.05 micrometers. The unfilled tape is also in the form of an electrical insulating sheet of mica paper having at least one woven fabric on at least one of its surfaces, and a resin binder permeating the mica paper and woven fabric so as to bond the woven fabric to the mica paper. However, the unfilled tape is essentially free of oxide particles.

According to this invention, a significant improvement in insulation life has been unexpectedly found for groundwall insulation formed by the combination of filled and unfilled mica tapes of this invention. In addition, this combination of tape materials appears to have a synergistic effect because the combination exhibits significantly improved results as compared to the individual materials when used alone.

Other objects and advantages of this invention will be better appreciated from the following detailed description.

BRIEF DESCRIPTION OF THE DRAWINGS

The present invention will now be described, by way of example, with reference to the accompanying drawings, in which.

DETAILED DESCRIPTION OF THE INVENTION

The present invention provides an insulation material whose electrical properties make the material particularly well suited for use as a prepreg electrical insulating material for electrical equipment and components, such as the groundwall insulation of a high voltage generator stator bar. The insulation material of this invention is characterized by having a significantly improved voltage endurance as compared to prior art groundwall insulation material. The material can be processed in accordance with known methods, including vacuum and heat treatments followed by cure under pressure (autoclaving), press-curing, and vacuum-pressure impregnation processes.

Figure 1:
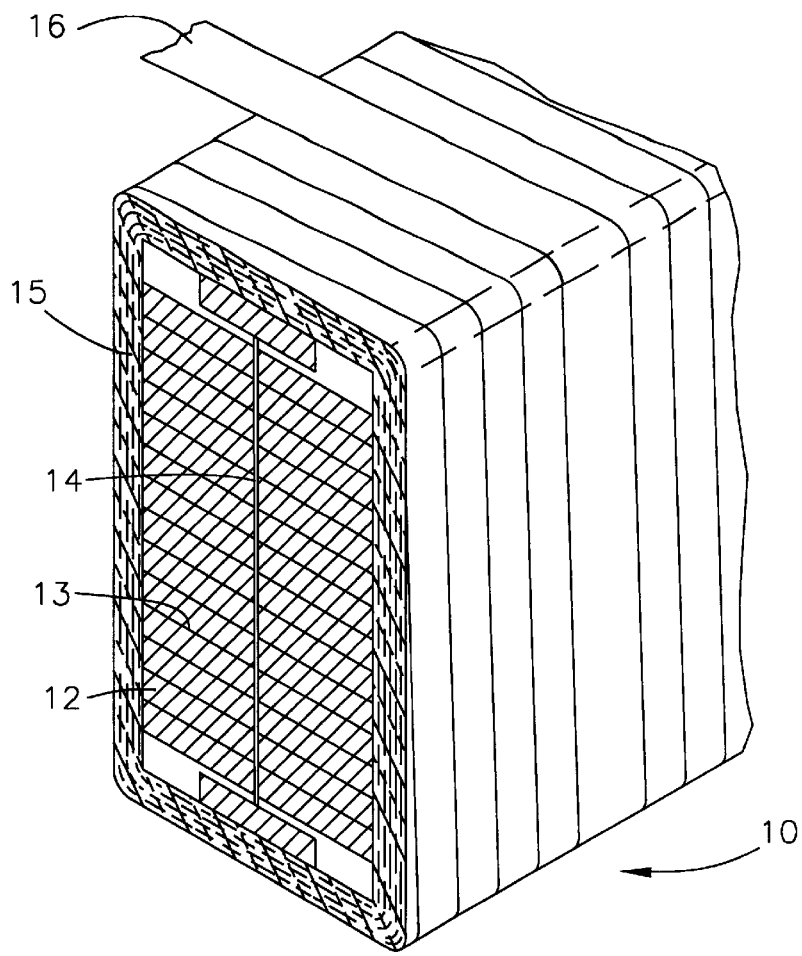
FIG. 1 shows in perspective a cross-section of a stator bar wrapped with a prepreg tape manufactured in accordance with the prior art.
Figure 8:
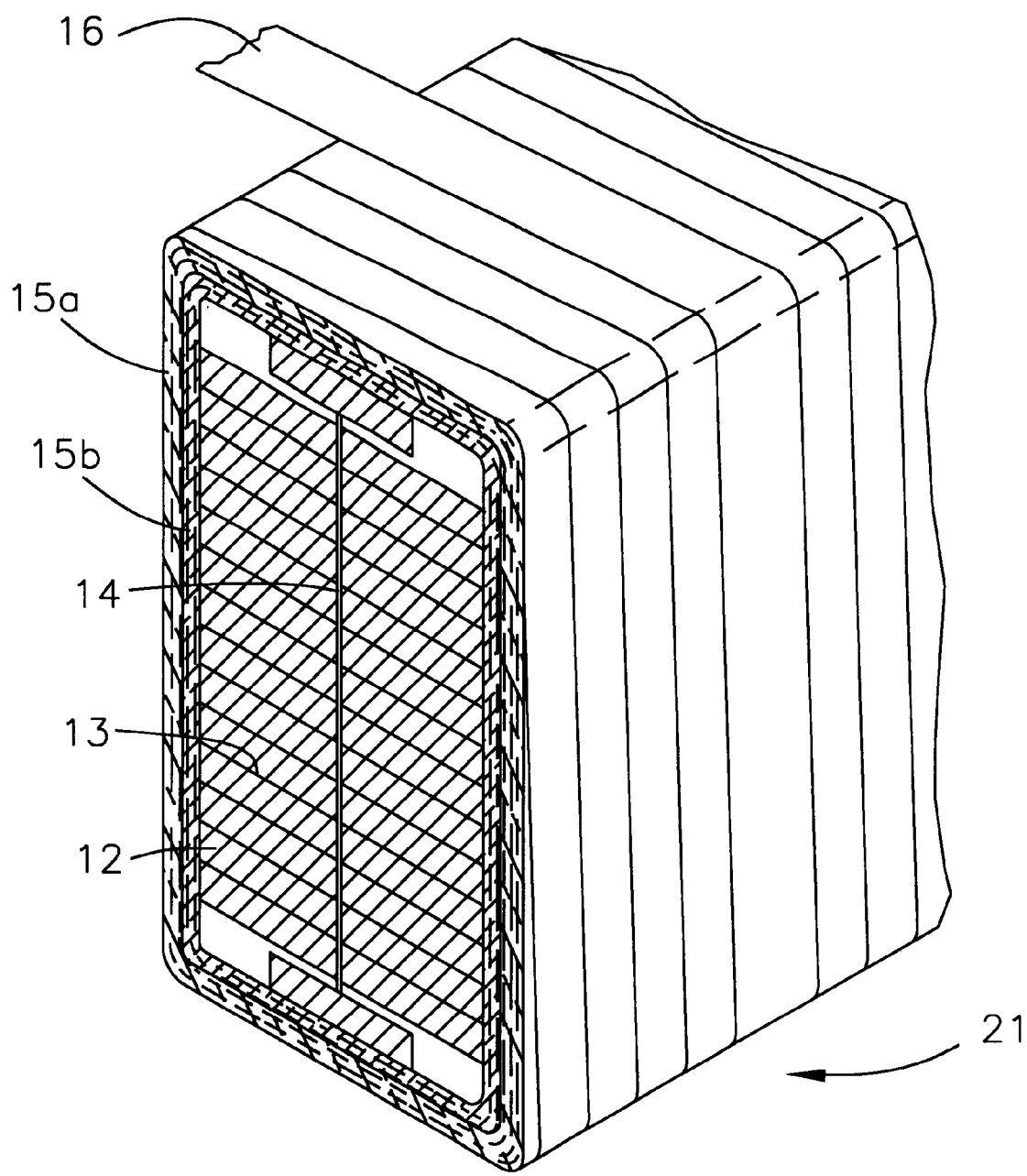
FIG. 8 shows in perspective a cross-section of a stator bar wrapped with a prepreg tape manufactured in accordance with this invention.

Referring to FIG. 8, a stator bar 21 for a generator is represented that is similar to the prior art stator bar 10 of FIG. 1. The stator bar 21 illustrates some of the general concepts of this invention, as well as a suitable application for the insulation material of this invention. As with the prior art stator bar 10, the stator bar 21 of this invention is composed of a number of conducting copper strands 12 that are insulated from each other by strand insulation 13, as is known in the art. In addition, the strands 12 are arranged to form two tiers that are separated by a strand separator 14. In contrast to the stator bar 10, the stator bar 21 of this invention is characterized by both tiers of strands being surrounded by a groundwall insulation formed by multiple wrappings of different insulating layers 15a and 15b formed by mica paper tapes 16 and 20, respectively, the latter of which has a novel composition in accordance with the teachings of this invention.

The stator bar 21 of FIG. 8 is merely intended to represent generally conventional conductors over which it is desirable to provide electrical insulation layers formed by a resin-impregnated sheet material. Therefore, the teachings of this invention are not limited to the specific configuration shown in the Figure, and are equally applicable to various other electrical components and assemblies that benefit from the presence of electrical insulation layers. It is also foreseeable that the teachings of this invention could be employed with various applications other than those involving a prepreg. Those skilled in the art will recognize that numerous applications for this invention are possible, all of which are within the scope of this invention.

According to this invention, it was surprisingly found that improved voltage endurance was achieved with the combination of mica tapes 16 and 20 if the mica tape 20 contains silicon dioxide, aluminum oxide, titanium dioxide and/or zirconium dioxide. These oxides are preferably provided in the resin binder used to make the tape 20 and, as represented in FIGS. 4 through 7, are dispersed as oxide particles 19 on the surface or surfaces of the tape 20. In contrast, the mica tape 16 does not contain any such filler. The voltage endurance performance of the combination of tapes 16 and 20 has been surprisingly found to be better than that possible if the ground insulation is formed by only one of the tapes 16 or 20. While U.S. Pat. No. 4,760,296 to Johnston et al., assigned to the same assignee of this invention, discloses resin compositions that, when used as electrical insulation, have unique corona resistance as a result of the presence of submicron aluminum oxide or silicon dioxide particles, those skilled in the art would not expect the improved voltage endurance achieved by this invention based on the teachings of Johnston et al. Furthermore, nothing in Johnston et al. suggests that the oxide-filled tape 20 used in combination with the oxide-free tape 16 would yield a stator bar 21 having significantly improved voltage endurance performance.

Figure 2:
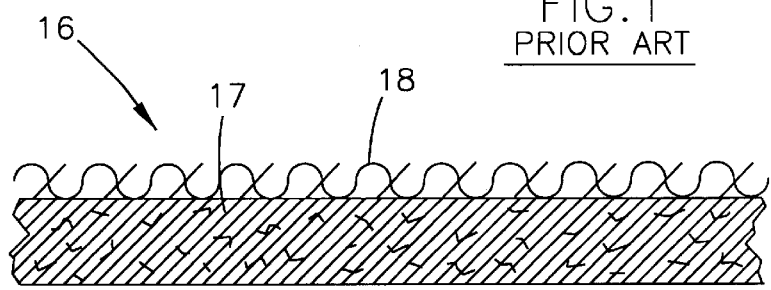
FIGS. 2 and 3 show cross-sectional views of two embodiments for the prepreg tape of FIG. 1.
Figure 3:
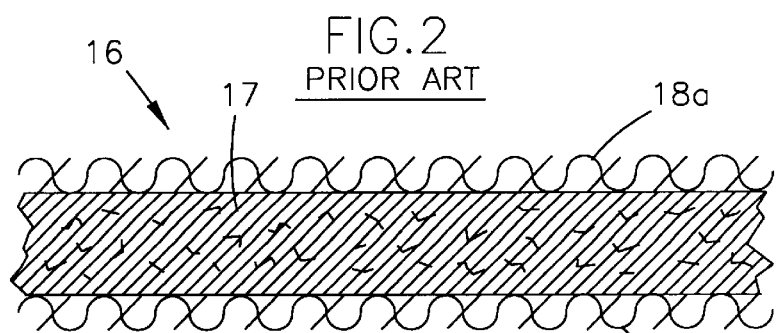
Figure 4:
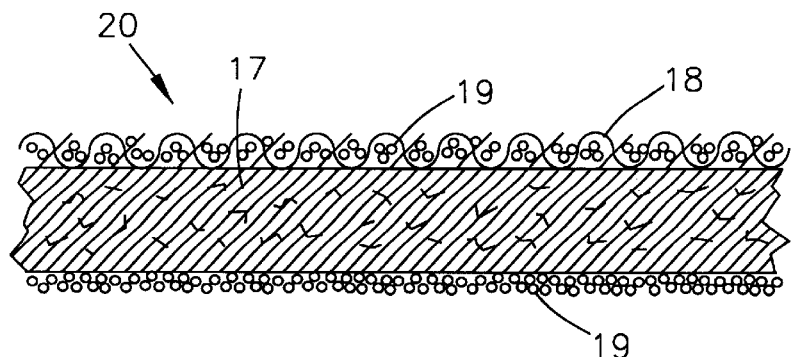
FIGS. 4 through 7 show cross-sectional views of alternative embodiments for a prepreg tape in accordance with this invention.
Figure 5:
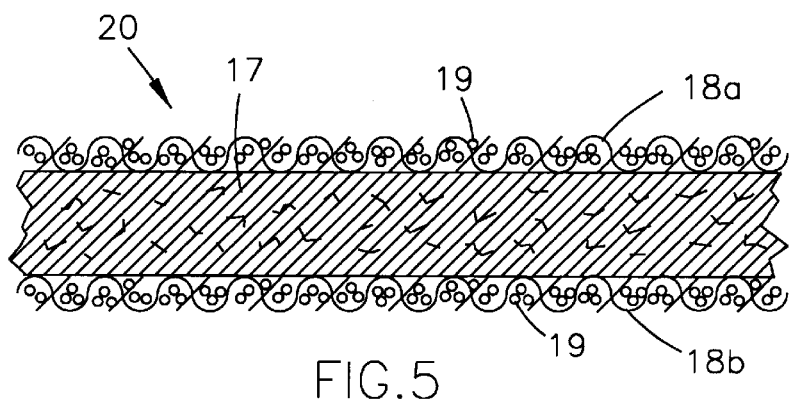
Figure 6:
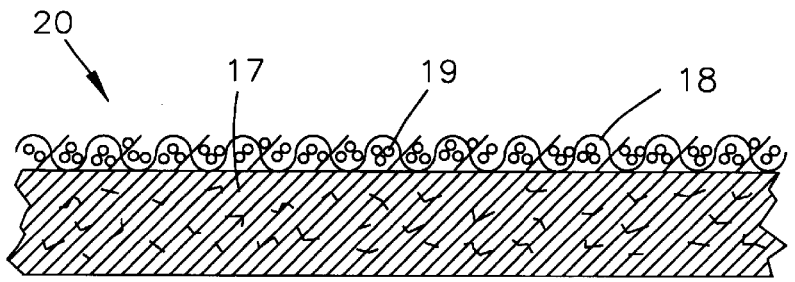
Figure 7:
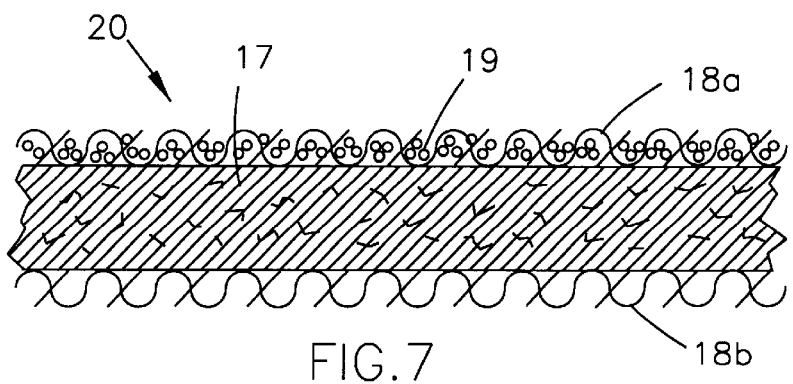

The mica paper tape 16 can be a prepreg of a type known in the prior art, e.g., a mica paper tape 17 having a woven backing 18/18a and an optional woven or nonwoven backing 18b bonded thereto with a resin binder, as represented in FIGS. 2 and 3. As illustrated in FIGS. 4 through 7, the mica paper tape 20 of this invention is also a prepreg composed of a mica paper 17 backed by a single woven backing 18 (FIGS. 4 and 6) or a pair of backings 18a and 18b (FIGS. 5 and 7). In the latter configuration, one of the backings 18a or 18b can be a woven fabric such as fiberglass while the second can be another woven fabric, a nonwoven fabric such as a polyester mat, or a polymeric film such as polyester or polyimide film. In each case, a resin binder containing oxide particles 19 in accordance with this invention is used to permeate through the mica paper 17 and bond each backing 18, 18a and 18b to the mica paper 17, thereby forming the prepreg tape 20. As shown in FIGS. 4 and 5, the resin binder can be applied to the tape 20 such that the oxide particles 19 are present on both surfaces of the tape 20 or, as represented in FIGS. 6 and 7, applied such that the oxide particles 19 are present on only one side of the tape 20. In all embodiments of this invention where the backings are woven and/or nonwoven fabrics (FIGS. 4–7), the resin binder permeates through the backings 18, 18a and 18b and the paper 17 to form a resin-rich prepreg. If an impermeable polymeric film is used for one of the backings 18a or 18b, the resin binder permeates the paper 17 to bond the polymeric film to the paper 17.

The resin binder affects the properties of the mica paper tapes 16 and 20, both while in the prepreg state and after appropriate curing steps are performed by which the mechanical and electrical properties of the groundwall insulation are acquired. The resin binders for the oxide-filled and unfilled tapes 20 and 16, respectively, are identical or use the same cure chemistry or otherwise have compatible cure chemistries. Suitable resin binders include solventless and solvent-containing epoxy, polyester and bismaleimide resins. A particularly suitable resin binder is disclosed in copending U.S. patent application Ser. No. 08/413,015 to Markovitz, and contains an epoxy resin, a metal acetylacetonate, and an accelerator. In a preferred embodiment shown in FIG. 8, the mica tape 20 containing the submicron oxide particles 19 forms inner groundwall layers 15b adjacent or near the tiers of conductor strands 12, while the unfilled tape 16 preferably forms the outer layers 15a of the groundwall insulation. The tapes 16 and 20 can be applied to form any number of alternating layers of filled and unfilled insulation. If multiple layers are formed by the filled tape 20 of this invention, the same or different oxides can be used as the particles 19 for any given layer formed by the tape 20. The filled tape 20 (or tapes 20, if more than one filled tape 20 is used) preferably comprises from approximately 10% to approximately 90% of the total number of tape layers that form the groundwall insulation, while the unfilled tape 16 preferably comprises the remainder of the groundwall insulation.

The mica tape 20 is preferably made by dispersing in the resin binder a small but effective quantity of the oxide particles 19, preferably having a particle size of from 0.005 to 0.05 micrometers. When dispersed in the resin binder in this particular size range, the oxide particles 19 have been found to form a chain-like particle network due to hydrogen bonding of the hydroxy groups on the oxide particles, which is believed to yield the benefits of this invention. During the manufacture of the mica tape 20, such as by hot melt soaking of a solventless resin binder or solution processing if solvent is used in the resin binder, the submicron oxide particles 19 are filtered by the mica paper 17 and are thereby concentrated on the surfaces of the paper 17. As depicted in FIGS. 4 through 7, the submicron oxide particles 19 may be present in the resin binder on any exposed surface of the paper 17 (FIG. 4), and/or on and between the fibers of the backings 18, 18a and 18b (FIGS. 4 through 7). If a polymeric film is used as one of the backings 18a or 18b, the submicron oxide particles 19 are present in the resin binder bonding the film to the mica paper 17. Alternatively, the submicron oxide particles 19 may be limited to one side of the mica paper 17, usually on the side of the woven fabric 18 and 18a as illustrated in FIGS. 6 and 7.

Those skilled in the art will gain a better understanding of the present invention and its advantageous properties and characteristics from the following illustrative examples.

EXAMPLE 1 (BASELINE)

A baseline groundwall insulation system, identified herein as "System A," was prepared in the form of a tape such as that shown in FIG. 3. System A employed an unfilled resin binder containing an epoxy resin blend, aluminum acetylacetonate catalyst, and a bisphenol A novolac accelerator, as disclosed in copending U.S. patent application Ser. No. 08/413,015 to Markovitz.

A baseline group of eighty stator bars were insulated with the System A insulation material, and then divided into five populations and tested at five different voltage stress levels in order to determine endurance life as a function of voltage stress. Based on the statistical distribution of the times-to-failure for this baseline group, a mathematical expression was developed to evaluate the performance of individual stator bars subsequently tested under identical conditions, but with groundwall insulation systems that included resin binders formulated in accordance with this invention. For convenience, voltage endurance performance of individual experimental bars is expressed in per unit of the median life expectancy for the baseline insulation System A.

Notably, voltage endurance tests performed with a mica tape having only one backing as shown in FIG. 2, but otherwise identical to the tape employed as System A, exhibited similar voltage endurance performance to System A.

EXAMPLE 2 (COMPARISON)

A resin-rich mica paper tape was made that used a resin binder similar to that of Example 1, but with a dispersion of about 12.0 weight percent of aluminum oxide having an average primary particle size of about 0.013 micrometer. A bar insulated with ten half-lapped layers of this tape had a voltage endurance life that was about 3.21 times the median life of insulation System A.

EXAMPLE 3 (INVENTION)

A stator bar was insulated with five half-lapped layers of the tape from Example 2 for the inner layers and five half-lapped layers of the tape from Example 1 for the outer layers (for a total of ten layers). The voltage endurance life of this bar was about 7.27 times the median life of insulation System A. This result evidences an unexpected improvement in voltage endurance where only the inner half of the groundwall insulation is formed with tape using an oxide-filled resin binder.

EXAMPLE 4 (COMPARISON)

A resin-rich mica paper tape was made with a resin binder that was similar to that used in Example 1, but with a dispersion of about 17.5 weight percent of fumed silicon dioxide having an average primary particle size of about 0.040 micrometer. A stator bar taped with eleven half-lapped layers of this tape experienced voltage endurance breakdown after about 5.27 times the median life of insulation System A.

EXAMPLE 5 (INVENTION)

A stator bar was wrapped with six half-lapped layers of the filled tape of Example 4 followed by five half-lapped layers of the unfilled tape of Example 1 (for a total of eleven layers). The bar experienced voltage endurance breakdown after about 8.51 times the median life of insulation System A. Accordingly, this result also evidences an unexpected improvement in voltage endurance where only the inner half of a stator bar groundwall insulation is formed with tape using an oxide-filled resin binder.

EXAMPLE 6 (COMPARISON)

A resin-rich mica paper tape was made with a resin binder that was similar to that of Example 1, but with a dispersion of about 8.0 weight percent of fumed silicon dioxide having an average primary particle size of about 0.040 micrometer. A stator bar insulated with eight half-lapped layers of this tape experienced voltage endurance breakdown after about 8.76 times the median life of insulation System A.

EXAMPLE 7 (INVENTION)

A stator bar was insulated with four half-lapped layers of the silicon dioxide-filled tape of Example 6, followed by four half-lapped layers of the unfilled tape from Example 1 (for a total of eight layers). The bar experienced voltage endurance breakdown after about 12.15 times the median life of insulation System A.

EXAMPLE 8 (COMPARISON)

A resin-rich mica paper tape was made with a binder that was similar to that of Example 1, but with a dispersion of about 12.5 weight percent of fumed titanium dioxide having an average primary particle size of about 0.021 micrometer. A stator bar was insulated with thirteen half-lapped layers of this tape. When tested for voltage endurance, testing was stopped after about 0.03 times the median life of insulation System A because of dielectric heating and suppressor damage.

EXAMPLE 9 (INVENTION)

A stator bar was insulated with one half-lapped layer of the titanium dioxide-filled tape of Example 8, then one half-lapped layer of the unfilled tape from Example 1, an additional half-lapped layer of the tape from Example 8, and finally an additional ten half-lapped layers of the tape from Example 1 (for a total of thirteen half-lapped layers of groundwall insulation). The bar experienced voltage endurance breakdown after about 1.71 times the median life of insulation System A. While the results were not comparable to that of Examples 3, 5 and 7, a comparison of these results with that of Example 8 again evidences the synergistic effect of combining filled and unfilled tapes.

EXAMPLE 10 (INVENTION)

A stator bar was insulated with seven half-lapped layers of the titanium dioxide-filled tape of Example 8, followed by six half-lapped layers of the unfilled tape from Example 1 (for a total of thirteen layers). When tested for voltage endurance, this bar surpassed about 1.14 times the median life of insulation System A before testing was terminated.

EXAMPLE 11 (INVENTION)

A stator bar was insulated with alternating half-lapped layers of two tapes for a total of thirteen layers. The titanium dioxide-filled tape of Example 8 was used for the odd-numbered layers (i.e., including the outermost layer), while the unfilled tape of Example 1 was used for the even-numbered layers. When tested for voltage endurance, this bar surpassed about 1.18 times the median life of insulation System A before testing was terminated.

EXAMPLE 12 (COMPARISON)

A resin-rich mica paper tape was made with a resin binder that was similar to that used in Example 1, but with a dispersion of about 7.5 weight percent of silicon dioxide having an average primary particle size of about 0.040 micrometer. A stator bar insulated with eight half-lapped layers of this tape experienced voltage endurance breakdown after about 2.03 times the median life of insulation System A.

EXAMPLE 13 (INVENTION)

A stator bar was insulated with two half-lapped layers of the silicon dioxide-filled tape of Example 12, followed by six half-lapped layers of the unfilled tape of Example 1 (for a total of eight layers). The bar experienced voltage endurance breakdown after about 4.21 times the median life of insulation System A.

EXAMPLE 14 (INVENTION)

A stator bar was insulated with a total of eight half-lapped layers of mica tapes. The silicon dioxide-filled tape of Example 12 was used for the first and third layers, the titanium dioxide-filled tape of Example 8 was used for the second and fourth layers, and the unfilled tape of Example 1 was used for the fifth through eighth layers. The bar did not experience voltage endurance breakdown even after reaching about 4.49 times the median life of insulation System A.

EXAMPLE 15 (INVENTION)

A stator bar was insulated with eight half-lapped layers of mica tapes. The titanium oxide-filled tape of Example 8 formed the first and third layers, the silicon dioxide-filled tape of Example 12 formed the second and fourth layers, and the unfilled tape of Example 1 formed the fifth through eighth layers. This bar experienced voltage endurance breakdown at about 9.79 times the median life of insulation System A.

EXAMPLE 16 (INVENTION)

A stator bar was insulated with eight half-lapped layers of mica tapes. The titanium oxide-filled tape of Example 8 formed the first two layers, the silicon dioxide-filled tape of Example 12 formed the third and fourth layers, and the unfilled tape of Example 1 formed the fifth through eighth layers. This bar experienced voltage endurance breakdown at about 6.70 times the median life of insulation System A.

Finally, in a population of twenty-eight stator bars having groundwall insulation formed by silicon dioxide-filled prepreg tapes prepared according to Example 4 (17.5% silicon dioxide in the binder), Example 6 (8.0% silicon dioxide in the binder, and other tapes containing 7.5% and 12.0% silicon dioxide in the binder, thirteen bars insulated with the filled tapes alone had a median voltage endurance life that was about 2.20 times the median life of insulation System A, while fifteen bars having groundwall insulation formed by a combination of the silicon dioxide-filled tape and an unfilled tape (per Example 1) exhibited a median life of about 4.21 times greater than that of System A. Further testing has shown that similar improvements in voltage endurance performance are attained when zirconium dioxide having an average particle size of about 0.030 micrometer is used as the filler in the resin binder for the mica tape.

While the binder used in the tapes of the above examples were based on blends of epoxy novolacs and liquid bisphenol A diglycidyl ether epoxy resins, a bisphenol A-formaldehyde novolac accelerator and aluminum acetylacetonate catalyst, other resin compositions can be used as the resin binder of this invention. Such resin binders include other solventless or solvent-containing epoxy resins, polyester resins, bismaleimide resins, polybutadiene and others. The only requirement for use with this invention is that the cure chemistry for the filled and unfilled tapes are the same or compatible. That is, the cure chemistries are compatible if there is neither cure inhibition nor very strong acceleration by one tape binder of the other.

The silicon dioxide used in the examples was a fumed silica available from the Degussa Corporation under the tradename AEROSIL OX50, though other fumed silicon dioxides could be used, such as a fumed silica having an average primary particle size of about 0.040 micrometer and available from the Degussa Corporation under the tradename AEROSIL TT660. Other suitable fumed silicon dioxides available from the Degussa Corporation include the following, with their average primary particle size shown in parentheses: AEROSIL 300, 380 and R812 (about 0.007 micrometer), AEROSIL 200, R805 and R974 (about 0.012 micrometer), AEROSIL 150 and R202 (about 0.014 micrometer), AEROSIL MOX 170 (about 0.015 micrometer), AEROSIL 130 and R972 (about 0.016 micrometer), AEROSIL 90 (about 0.020 micrometer) and AEROSIL MOX 80 (about 0.030 micrometer). Other fumed silicon dioxides include the CAB-O-SIL silicon dioxides made by the Cabot Corporation. These include CAB-O-SIL M-5, M-7, MS-7, M-7D and PTG-1, which have a nominal particle size of about 0.014 micrometer, CAB-O-SIL MS-75 with a nominal particle size of about 0.011 micrometer, CAB-O-SIL H-5 and HS-5 with a nominal particle size of about 0.008 micrometer, and CAB-O-SIL EH-5 and S-17 with a nominal particle size of about 0.007 micrometers. Surface treated fumed silicas such as Cabot's CAB-O-SIL TS-720, TS-610 and TS-530 can also be used. In place of fumed silicon dioxides, precipitated silicon dioxides having a particle size of about 0.005 to about 0.05 micrometer can also be used.

The aluminum oxide used in the above examples had an average primary particle size of about 0.013 micrometer, and is commercially available from the Degussa Corporation under the name ALUMINUM OXIDE C. The titanium dioxide used in the above examples is commercially available from the Degussa Corporation as TITANIUM DIOXIDE P25, having an average primary particle size of about 0.021 micrometer. Finally, the zirconium dioxide used in the above examples had an average primary particle size of about 0.030 micrometer, and is commercially available from the Degussa Corporation as VP ZIRCONIUM OXIDE. Other grades of aluminum oxide, titanium dioxide and zirconium dioxide having an average primary particle size of about 0.005 to about 0.05 micrometer could also be used.

From the above evaluations, it was determined that the submicron oxide content of the resin binder could range from about 2.0 weight percent (i.e., about 2.0 parts-by-weight of the submicron oxide in about 98.0 parts-by-weight of resin solids) to about 30.0 weight percent (i.e., about 30.0 parts-by-weight of the submicron oxide in about 70.0 parts-by-weight of resin solids), with a preferred range being about 4.0 to about 20.0 weight percent oxide.

From the above examples, it can be seen that groundwall insulation (e.g., groundwall insulation 15a and 15b of FIG. 8) formed by resin-rich mica paper tapes in accordance with this invention (i.e., Examples 3, 5, 7, 9–11 and 13–16) exhibited superior voltage endurance performance as compared to the baseline and comparative examples (Example 1 and Examples 2, 4, 6, 8 and 12, respectively). Most unexpectedly, voltage endurance performance was far superior when a combination of filled and unfilled tapes were used to form the groundwall insulation (Examples 3, 5, 7, 9–11 and 13–16), as opposed to groundwall insulation formed only by filled tapes (Examples 2, 4, 6, 8 and 12). Accordingly, it can be seen that there exists a synergistic effect between filled and unfilled tapes. Another significant advantage of this invention is that the above performance improvements are achieved without adversely affecting processing of the tapes 16 and 20 and the stator bar 21.

While our invention has been described in terms of a preferred embodiment, it is apparent that other forms could be adopted by one skilled in the art. For example, the resin-rich tapes of this invention could be used in the manufacture of precured sheet materials, fabrics and films for uses other than forming the groundwall insulation of a high voltage generator stator bar. Accordingly, the scope of our invention is to be limited only by the following claims.

What is claimed is:

1. An electrical insulating material comprising at least first and second insulating layers, the first insulating layer comprising:
   a mica paper having first and second surfaces on opposite sides of the mica paper;
   a woven fabric on the first surface of the mica paper;
   a resin composition permeating the woven fabric and bonding the woven fabric to the mica paper; and
   oxide particles dispersed in the woven fabric;
   wherein the second insulating layer is free of oxide particles.

2. An electrical insulating material as recited in claim 1, wherein, the oxide particles are at least one oxide chosen from the group consisting of silicon dioxide, aluminum oxide, titanium dioxide and zirconium oxide, the oxide particles having a particle size of about 0.005 to about 0.05 micrometers.

3. An electrical insulating material as recited in claim 1, wherein the resin composition and oxide particles also cover the second surface of the mica paper.

4. An electrical insulating material as recited in claim 1, further comprising a backing on the second surface of the mica paper, the resin composition bonding the backing to the mica paper.

5. An electrical insulating material as recited in claim 4, wherein the backing is a nonwoven fabric.

6. An electrical insulating material as recited in claim 4, wherein the backing is a second woven fabric permeated by the resin composition and having oxide particles dispersed therein, the oxide particles dispersed in the second woven fabric being at least one oxide chosen from the group consisting of silicon dioxide, aluminum oxide, titanium dioxide and zirconium oxide, the oxide particles having a particle size of about 0.005 to about 0.05 micrometers.

7. An electrical insulating material as recited in claim 1, the electrical insulating material being groundwall insulation on a stator bar.

8. An electrical insulating material as recited in claim 1, wherein the second insulating layer comprises:
   a mica paper having first and second surfaces on opposite sides of the mica paper; and
   a woven fabric bonded to the first surface of the mica paper.

9. An electrical insulating material as recited in claim 8, further comprising a backing on the second surface of the mica paper of the second insulating layer.

10. A stator bar comprising:
    a plurality of conductors arranged in a group;
    insulation insulating the conductors from each other;
    groundwall insulation surrounding the group of conductors, the groundwall insulation comprising first and second insulating layers, the first and second insulating layers each comprising:
      a mica paper having first and second surfaces on opposite sides of the mica paper;
      a woven fabric on the first surface of the mica paper; and
      a resin binder permeating the woven fabric and bonding the woven fabric to the mica paper;
    wherein the first insulating layer further comprises oxide particles dispersed in the woven fabric, and wherein the second insulating layer is free of oxide particles.

11. A stator bar as recited in claim 10, wherein the oxide particles are at least one oxide chosen from the group consisting of silicon dioxide, aluminum oxide, titanium dioxide and zirconium oxide, the oxide particles having a particle size of about 0.005 to about 0.05 micrometers.

12. A stator bar as recited in claim 10, wherein the second insulating layer overlays the first insulating layer.

13. A stator bar as recited in claim 10, wherein the resin binder and oxide particles also cover the second surface of the mica paper of the first insulating layer.

14. A stator bar as recited in claim 10, wherein the first insulating layer further comprises a backing on the second surface of the mica paper, the resin binder bonding the backing to the mica paper of the first insulating layer.

15. A stator bar as recited in claim 14, wherein the backing is a nonwoven fabric.

16. A stator bar as recited in claim 14, wherein the backing is a second woven fabric permeated by the resin composition and having oxide particles dispersed therein, the oxide particles dispersed in the second woven fabric being at least one oxide chosen from the group consisting of silicon dioxide, aluminum oxide, titanium dioxide and zirconium oxide, the oxide particles having a particle size of about 0.005 to about 0.05 micrometers.

17. A stator bar as recited in claim 10, wherein the groundwall insulation comprises multiple layers of the first and second insulating layers, the first insulating layers being separated by one of the second insulating layers.

18. A stator bar as recited in claim 17, wherein the first insulating layers constitute about 10 to about 90 percent of the groundwall insulation.

19. A stator bar as recited in claim 10, wherein the resin binder consists essentially of an epoxy resin, a metal acetylacetonate, and an accelerator.

20. A stator bar comprising:

a plurality of conductors arranged in tiers;

insulation insulating the conductors from each other;

groundwall insulation surrounding the tiers of conductors, the groundwall insulation comprising first and second insulating layers, the first and second insulating layers each comprising:
  layers of a mica paper;
  a woven fabric on at least one surface of the mica paper; and
  a resin binder permeating the woven fabric and bonding the woven fabric to the mica paper;

wherein the first insulating layer further comprises oxide particles dispersed in the woven fabric, the oxide particles being at least one oxide chosen from the group consisting of silicon dioxide, aluminum oxide, titanium dioxide and zirconium oxide, the oxide particles having a particle size of about 0.005 to about 0.05 micrometers;

wherein the second insulating layer is free of oxide particles; and wherein the first insulating layer constitutes about 10 to about 90 percent of the groundwall insulation.

* * * * *